May 13, 1952 E. UNGAR 2,596,308
METERING SYSTEM FOR TELEPHONY
Filed April 15, 1949
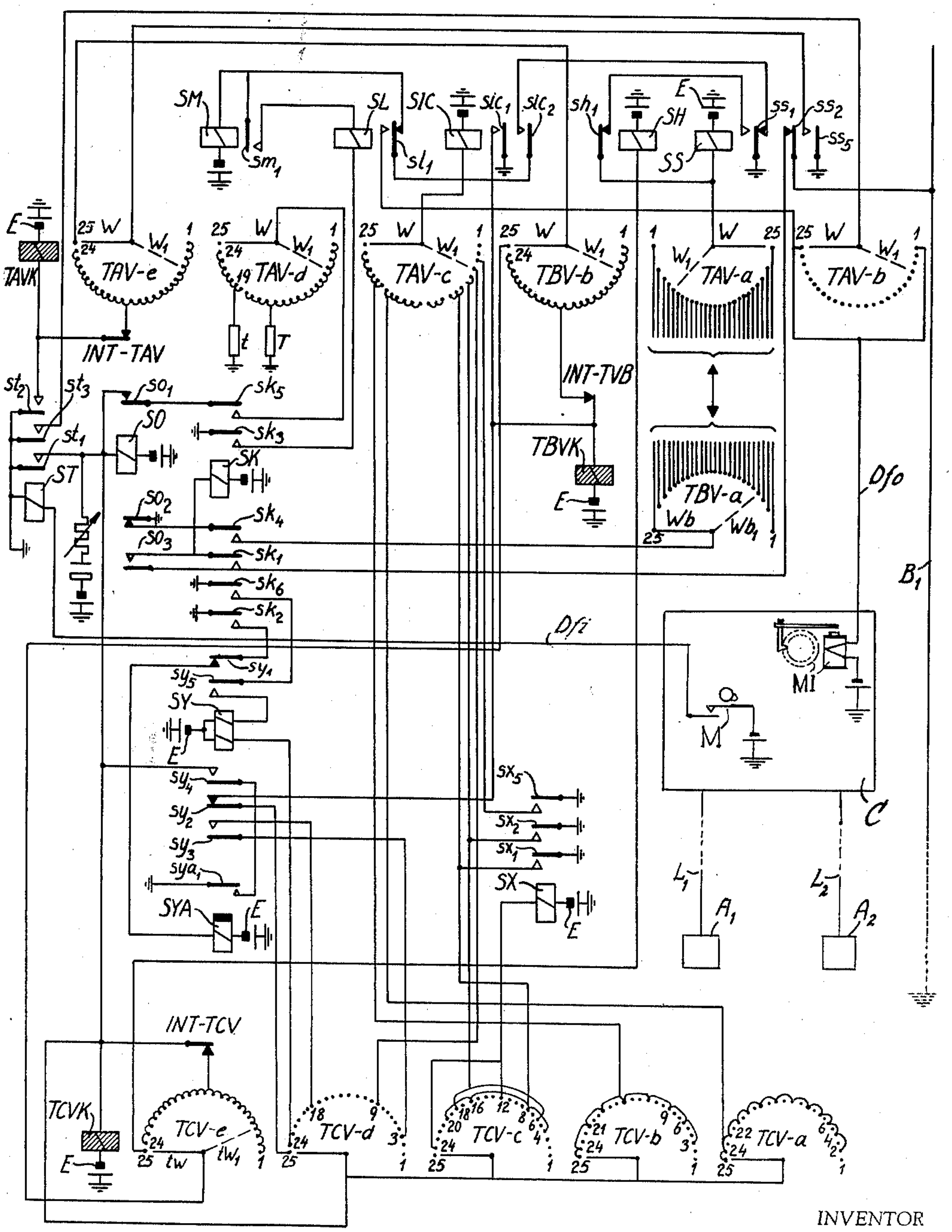
INVENTOR
Ernest Ungar
BY Watson, Cole, Grindle & Watson
ATTORNEYS Patented May 13, 1952

2,596,308

UNITED STATES PATENT OFFICE 2,596,308

METERING SYSTEM FOR TELEPHONY

Ernest Ungar, Copenhagen, Denmark, assignor of one-half to Telefon Fabrik Automatic A/S, Copenhagen, Denmark, a joint-stock company of Denmark Application April 15, 1949, Serial No. 87,751
In Denmark April 21, 1948

3 Claims. (Cl. 179—7.1)

The charge to be made for trunk calls in a telephone system is ordinarily computed from a tariff based on a conversational period of three minutes as a unit.

In automatic systems, the charge for trunk calls is ordinarily made wholly or in part on the subscriber's meter by means of pulse series that are transmitted at the commencement of each conversational period. Accordingly, when calling from a coin operated telephone, the calling party must pay the total amount for the whole of the conversational period before a call can be established.

It would be a considerable advantage if it were possible to have a call established for a shorter period than the said three minutes, if the person wanting the call does not for the moment dispose of coins corresponding to a three minutes call. Moreover, it might be contemplated to adopt a charging system according to which the charge for calls was not based on periods of a predetermined length, but on the actual duration of the conversation, viz. by means of pulses transmitted to the subscriber's meter at regular intervals distributed over the duration of the conversation. If so, the time interval between the metering pulses must vary with the distance of the desired substation from the calling subscriber, i. e. in the case of calls over shorter distances, where the unit charge is different from that applying to calls over longer distances, the pulses must be transmitted at greater time intervals than in the case of calls over longer distances.

The present invention relates to an arrangement in metering circuits in which such a change of the existing charging systems is rendered possible without necessitating a replacement of the time zone metering devices of existing automatic telephone systems. By the invention, it is also made possible under the existing charging system with a conversational period of a predetermined length, to make a trunk call from a coin operated telephone by means of metering pulses over part of the period only against payment of a corresponding fraction of the charge. To obtain this, the invention is characterized in that between the source delivering the metering pulses, and the metering circuit or a coin control circuit, if such a circuit is provided, a device is interposed that receives the metering pulses and extends such pulses or some of them to the metering circuit or the coin control circuit or both at a time interval which is longer than the time interval between the pulses delivered by the said source and depends on the number of metering pulses received at the commencement of the period, the said device comprising a member adapted to be automatically set under the influence of the metering pulses received and a member adapted under the influence of other pulses transmitted at predetermined time intervals to be advanced step by step and being connected with the first named member in such a manner that whenever advanced by a number of steps depending on the position of said first named member it will transmit a setting pulse to the metering circuit and at the same time to a member which is constructed in such a manner as to be advanced by one step upon receipt of each pulse and is so connected with the member set by the metering pulses received that when advanced to a position corresponding to that of the last named member, said member causes a circuit to be closed which causes the transmission of pulses to the metering circuit or coin control circuit or both to be stopped.

The invention will best be understood from the following explanation of the function of the circuit shown by way of an example in the accompanying drawing which circuit is so constructed that within a conversational period a number of pulses corresponding to the charge for the call in question are transmitted at regular intervals uniformly distributed over the period to the metering device, counting mechanism or/and the coin control circuit of a coin control station, so that the number of the pulses corresponds to the number of pulses received from a charging device at the commencement of the period.

When the central station C to which a calling subscriber $A_1$ and a called subscriber $A_2$ are connected in the ordinary manner by way of conductors $L_1$ and $L_2$ respectively, at the commencement of a conversation period transmits metering pulses by way of a source MI, these pulses are by way of a conductor D*fi* received by a relay ST. When the first one of these pulses operated the relay ST, the latter closes temporarily a number of contacts $st_1$, $st_2$, $st_3$. The contact $st_1$ energizes a relay SO, which works with a certain delay so as to remain attracted during the whole of the period between each two consecutive metering pulses transmitted to the relay ST from outside. At the same time, the relay ST energizes the switching magnet TAVK of a step by step switch TAV by way of the contact $st_2$. The switch TAV is thereby advanced by one step. This is repeated every time a metering pulse is received by the relay ST.

The relay SO when operated changes over a number of contacts $so_1$, $so_2$, $so_3$. The contact $so_3$ closes a circuit from a conductor B1 by way of a breaking contact $ss_2$, the contact $so_3$ and the control coil of a relay SK, whereby this relay operates and locks itself by way of a contact $sk_1$ and at the same time closes a set of contacts $sk_2$ $sk_3$, $sk_4$, $sk_5$, whereby a relay SYA is energized by way of the contacts $sk_2$ and $sy_1$ in series. The relay SYA thereby closes a contact *sya* and thereby prepares a temporary subsequent energization of the switching magnet TCVK of a switch TCV, the function of which will be explained in the following.

The first pulse, or in the embodiment described, the first and the second pulse received by the relay ST is extended over the conductor D*fo* directly to a metering circuit, not shown, which may be of well known design and does not form part of the invention. The said metering circuit is connected to the conductors D*fo* and B1. The said extension of the pulses is effected by the contact $st_3$ which synchronously with the operation of the relay ST closes a circuit connection from earth by way of the bank contacts 25 and 1 of the bank level TAV–*b*, which contacts are connected to the conductor D*fo* when the said switch TAV is advanced through the first and the second of these two contact positions which is effected by the contact $st_2$ controlled by the relay ST energizing the switching magnet TVAK of the switch TVA.

When the relay ST receives the third—or, if the terminal 1 of the bank TAV–*b* is not connected to the conductor D*fo*—then the second metering pulse and thereby causes the switching magnet TAVK to advance the switch TAV to its next contact position *i* in the embodiment shown the third contact position, the connection from the contact $st_3$ to the conductor D*fo* in the bank level TAV–*b* is interrupted. This third metering pulse and the subsequent metering pulse received via the relay ST are therefore not transferred to the metering circuit but just advance the switch TAV by one step in response to each pulse received.

When the relay ST does no longer receive pulses, e. g. when the wiper *w* of the various switch levels TAV–*a*—TAV–*d* have been set, e. g. in the position $w_1$ shown in dotted lines, the relay SO is de-energized because the contact $st_1$ remains opened. A contact $so_1$ controlled by the relay SO is thereby closed which has the effect that the switching magnet TCVK of a switch TCV automatically receives special current pulses, so-called timing pulses, i. e. pulses that are automatically transmitted at constant time intervals from a pulse source T by way of the bank contacts of the bank level TAV–*d*, the wiper of such level in position $w_1$, the relay contacts $sk_5$ and $so_1$, the switching magnet TCVK and a current source E.

The first timing pulse operates both the switching magnet TCVK which thereby advances the switch TCV by one step and the switching magnet TBVK of a switch TBV, the timing pulse being extended from the pulse source T by way of the contacts of the bank level TAV–*d* and the wiper in position $w_1$, the contacts $sk_5$ and $so_1$, the wiper *tw* and the contact 25 of the bank level TCV–*d* and a breaking contact $sy_2$ to the switching magnet TBVK and thence via the current source E to earth. Thus operated, the switch TBV moves to position 1. The bank contacts of the various levels of the switch TCV are, as shown, connected with the bank contacts of the level *c* of the switch TAV in such a manner that during the rotary movement of the switch TCV, some of the timing pulses are extended by way of the bank levels of this switch and the contacts of the bank level TAV–*c* to a relay SIC, so that, as will be described below, this relay during a conversational period receives a number of the said timing pulses uniformly distributed over the conversational period, viz. a number amounting to one pulse less than the number of metering pulses received via the relay ST.

Upon receipt of each timing pulse, the relay SIC operates and closes a contact $sic_2$. As will be described below, the first timing pulse received by the relay SIC will not release any pulse to the metering circuit, not shown, connected to the conductors D*fo* and B1, because a contact $sl_1$, which is controlled by a relay SL and is connected in series with the contact $sic_2$, keeps the connection between the metering circuit and the conductor D*fo* interrupted. The first timing pulse only has the effect that a relay SM is energized by way of three contacts $ss_1$, $sic_2$ and $sl_1$ in series and that by closing its contacts $sic_1$, the relay SIC advances the switch TBV by one step. When the said timing pulse ceases, the relay SIC is de-energized, and this has the effect that a relay SL is energized by way of the contact $sk_3$, the winding of the relay SL, the contact $sm_1$ and the winding of the relay SM, whereby the latter relay is locked and the relay SL closes the contact $sl_1$.

The subsequent timing pulses received by the relay SIC have the effect that by closing the contact $sic_2$, this relay closes an earth connection to the conductor D*fo* by way of the contacts $ss_1$, $sic_2$ and $sl_1$ in series, whereby a metering pulse is released in the metering circuit, not shown, connected to the conductor D*fo*. At the same time, the switch TBV as advanced by one step each time the contact $sic_1$ is operated.

As mentioned, the apparatus is constructed in such a manner as to terminate a conversational period in the course of three minutes. The charge to be made for such a period depends on the distance and other special circumstances forming the basis of the tariff, and the tariff is indicated by the number of metering pulses received, so that the higher the tariff applicable to the call in question having a duration of three minutes, the higher will be the number of metering pulses received, and accordingly the higher will be the number of pulses to be transmitted by means of the switch TCV and the relay SIC to the metering circuit by way of the parts of the conductor D*f* shown in the right hand side.

The connections between the bank contacts of the switch TCV and the bank contacts of the switch TAV are made in such a manner that the setting of the switch TAV caused by the metering pulses received and corresponding to the number of such metering pulses determines the number of pulses transmitted during a conversational period to the relay SIC and again transmitted to the metering circuit by means of the latter relay. The nature of these connections is apparent from the drawing and may best be understood from the following description of the operation of the function of the device when ST receives a certain number, e. g. four metering pulses. Under these circumstances, the relay SIC has to receive three pulses distributed over the conversational period of three minutes, i. e. these pulses are to occur at a time interval of 45 seconds, and as will be apparent from the following, the metering circuit will then receive a total of four metering pulses of which the two first ones, as mentioned, are transferred directly in by-pass to the switches at the commencement of the conversational period.

If, as above assumed, the relay ST receives four metering pulses, the switch TAV will be set in position 4 in the manner described above. The first two pulses are extended to the metering circuit, as above mentioned, by the operation of the contact $st_3$. When the metering pulses cease, the relay ST is de-energized, and this again causes the relay SO to be de-energized. The contact $so_1$ connects the switching magnet TCVK of the switch TCV to the timing pulse source which e. g. transmits pulses every fifth second, and the switching magnet advances the switch TCV step by step, viz. one step every fifth second. In the example considered, a timing pulse is to be transferred to the relay SIC every 45th second, i. e. the first time in the moment the switch TCV arrives at its ninth bank contact. A circuit is then closed from the timing pulse source T via the bank level TAV–*d*, the wiper $w_1$, the relay contacts $sk_5$ and $so_1$, the wiper *tw*, and the ninth contact of the bank level TCV–*d*, the conductor $L_1$, the fourth contact of the bank level TAV–*c*, the wiper $w_1$ thereof, the relay SIC, the current source E and earth, whereby the relay SIC receives a pulse from the timing pulse source T and operates its contacts which, as previously mentioned, cause the relays SM and SL to be operated. At the same time, the switch TBV is advanced by one step by the temporary operation of the contact $sic_1$ of the relay SIC.

When the switch TCV has been advanced by another nine steps, i. e. to the contact 18, the mentioned circuit via the relay SIC is closed again, this time by way of the contact 18 of the bank level TCV–*d* instead of the contact 9 thereof. Accordingly, the relay SIC receives another timing pulse and again closes its contacts $sic_1$ and $sic_2$ which has the effect that a pulse is again released over the contacts $ss_1$, $sic_2$ and $sl_1$. Besides, the switch TBV is advanced by another step by the temporary operation of the contact $sic_1$.

The switch TCV is continually advanced by one step every fifth second, and when it passes position 24, a circuit is closed from the timing pulse source T, the bank level TAV–*d*, the wiper $w_1$ thereof, the relay contacts $sk_5$ and $so_1$, the wiper *tw* of level TCV–*d*, the contact 24 thereof, the relay SY and the current source E, whereby the relay SY is energized and locks itself over the relay contacts, a contact $sy_5$ controlled thereby, and the contact $sk_6$. At the same time, the relay SY opens another contact $sy_1$ controlled thereby, whereby a relay SYA, which was operated upon operation of the relay SK is de-energized. During the de-energizing time of the relay SYA, a circuit for the switching magnet TCVK is closed by way of the contacts $sy_4$ and $sya_1$ in series. The switch TCV is accordingly advanced by one step from position 24 to position 25 and has thereby passed through all of its contact positions 1—25 which are assumed to be uniformly distributed along a circular arc of 360°, this assumption also applying to all of the other switches TAV and TBV. Accordingly, when under the continued influence of the timing pulses, the switch TCV commences a new cycle through its contact positions, then, when 45 seconds have passed since it was set on the contact 18, it will arrive at the contact 3, and the relay SIC then receives another pulse from the timing pulse source T by way of the bank level TAV–*d*, the wiper thereof, the contacts $sk_5$ and $so_1$, the wiper *tw*, and the contact 3 of the bank level TCV–*d*, the contact $sy_3$ closed by the relay SY, the contact 4 of the bank level TAV–*c* and the wiper *w* thereof. Thereby a pulse is again transmitted to the metering circuit, and the latter accordingly has received a total of four pulses corresponding to the charge for the call in question. At the same time, the switch TBV is advanced by another step, viz. to the bank contact 4, it being remembered that this switch was advanced by one step when the switch TCV was advanced by the first step.

Since each of the bank contacts 1—24 of the bank level TBV–*a* is conductively connected with a bank contact in a corresponding position in the bank level TAV–*a*, i. e. the bank contact 4 of the bank level TBV–*a* is connected with the bank contact 4 of the bank level TAV–*a*, the relay SS will now be energized from the current source E via the relay SS, the wiper *w* of the bank level TAV–*a*, the fourth bank contact thereof, the fourth bank contact of the level TBV–*a*, the wiper *wb* thereof, the contact $sk_4$ and the contact $so_2$ to earth. The relay SS is operated and is held by a contact $sh_1$ of a relay SH in series with a contact $ss_1$ of the relay SS itself, the latter contact at the same time preventing more pulses from being transmitted to the metering circuit by interrupting the earth connection to the conductor D*fo*. When the relay SS operates its contacts, the relay SK is de-energized. Moreover, a homing circuit for the switch TAV is closed over the contact $ss_3$ of the relay SS, the wiper *w* of the bank level TAV–*e*, the self interrupting contact INT–TAV, the switching magnet TAVK and the current source E. The switch TAV is then restored to its home position, i. e. to position 25 and thereby closes a homing circuit for the switching magnet TBVK of the switch TBV via the contact $ss_2$, bank contact 25 of level TAV–*e*, the wiper *wb* of bank level TBV–*b*, a contact of this level and the self interrupting contact INT–TCV, whereby the switch TBV is likewise restored to position 25. Thereby a circuit is closed from earth by way of the bank contact 25 of level TAV–*e*, the wiper *wb* of level TBV–*b*, the bank contact 25 thereof, the wiper *tw* of level TCV–*e*, the self interrupting contact INT–TCV thereof, and the switching magnet TCVK which then restores TCV to its home position on the contact 25. The relay SH is now energized over the contact $ss_2$ and the wipers *w*, *wb* and *tw* of the levels TAV–*e*, TBV–*b* and TCV–*e* in series and opens its contact $sh_1$, whereby the relay SS is de-energized and interrupts the circuit connection over SH, which is likewise de-energized.

The described apparatus is then ready to receive a new metering pulse series.

If the relay ST receives a greater number of pulses, e. g. nine, the switch TAV is automatically advanced to the ninth contact of its bank levels, and the above described functions are repeated only with the difference that nine timing pulses are now transmitted over the switches TCV and TAV to the relay SIC with equal time intervals of 20 seconds. This means that the relay SIC received such a pulse for each four step by which the switch TCV is advanced to be set on the bank contacts 4, 8, 12, 16, 20 and 24 during the first travel over all of the bank contacts and when set on the bank contacts 4 and 8 during the second travel. As appears from the drawing the bank contacts 4, 8, 16 and 20 of the bank level TCV–*c* are directly connected to the 7th, 8th and 9th bank contact of the bank level TAV–c, whereas the bank contacts 12 and 24 of the bank level TCV–c are connected to earth through the energizing winding of a relay SX and the current source E.

The relay SX controls three contacts $sx_1$, $sx_2$ and $sx_3$. The contact $sx_1$ is arranged to close the impulse circuit of the relay SIC, when the wiper of the bank level TAV–c is set on the 9th bank contact, whilst the wiper of the bank level TCV–c at the same time is set on the 12th or 24th bank contact. The contact $sx_2$ is arranged to close the impulse circuit of the relay SIC when the wiper *two* of the bank level TCV–c is set on the 6th bank contact of said bank level, corresponding to an impulse interval of 30 seconds, and the wiper of the bank level TCV–c is set on the 12th and 24th bank contact. If the number of metering pulses received becomes greater than 18, the timing pulses advancing the switch TCV must occur at shorter time intervals than 5 seconds, e. g. at a time interval of 2, 5 seconds in order than a sufficiently uniform distribution of the many pulses transmitted by the relay SIC should be obtained. With a view to this, the contacts of bank level TAV–*d* is split up so that timing pulses are transmitted at an interval of 5 seconds from the timing pulse source T, if the said switch is in a position between 1 and 18 while pulses are transmitted at time interval of 2, 5 seconds from another timing pulse source *t* if the switch TAV is in a position between 18 and 24.

Having now particularly described and ascertained the nature of my invention and in what manner the same is to be performed, I declare that what I claim is:

1. In a telephone system, the provision of a circuit arrangement for controlling the charge for the duration of a calling subscriber's telephone call, comprising in combination a source for transmitting metering pulses, a meter responsive to said pulses, a timing circuit interposed between said source of pulses and said meter and comprising a member responsive to said pulses, a first stepping switch controlled by said pulse responsive member to be automatically set stepwise one step for each pulse received by said responsive member, a second stepping switch, a timing device connected in the operating circuit of said two stepping switches to advance this said second switch stepwise at predetermined time intervals, circuit connections between different groups of bank contacts of one level of said second stepping switch and groups of bank contacts of one level of said first stepping switch to connect the timing device at intervals dependent upon the number of received metering pulses to the wiper of said level of the first stepping switch, a relay responsive to current pulses produced by said timing device in the circuits extended from said device by way of the said bank contacts and the said two wipers and arranged to transmit said current pulses to the operating circuit of the subscriber's meter, a third stepping switch arranged to be set stepwise by the operation of the member responsive to the pulses transmitted from the first-mentioned source of pulses and transmit from the said source of pulses directly to the subscriber's meter, and to be set further by the operation of the said relay during the transmission of pulses to the subscriber's meter by the operation of this relay, the bank contacts of one level of said third stepping switch and the bank contacts of one level of the said first stepping switch being interconnected in pairs to cause the wiper of said two levels to be electrically interconnnected when the said wiper of the third stepping switch is set on a bank contact which is connected to that bank contact of the last-mentioned level of the first stepping switch on which the wiper of this level has been set by the operation of the member responsive to the metering pulse, in order to complete a current circuit through said wipers for interrupting the call automatically.

2. In a telephone system according to claim 1 means for preventing the first one of the current pulses transmitted from the timing device to the relay connected in the circuit of the wipers of the first and second stepping switches to be transferred to the operating circuit of the calling subscriber's meter.

3. In a telephone system, the provision of a circuit arrangement for controlling the charge for the duration of a calling subscriber's telephone calls, comprising in combination a source for transmitting metering pulses, a meter responsive to said pulses, a pulse responsive member receiving said pulses, a stepping switch operable one step by each of said metering pulses received by said pulse responsive member, circuit connections between said meter and said stepping switch and between said stepping switch and said pulse responsive member for transmitting some of said metering pulses at the commencement of a call directly to the said meter, means for interrupting the transmission to said meter of further metering pulses received by said pulse responsive member, a timing device for producing timing pulses to substitute said further metering pulses and means responsive to said timing pulses and controlling contacts connected in the circuit of said meter to transmit said timing pulses to said meter at time intervals between each two consecutive timing pulses which are larger than the intervals between consecutive metering pulses received by the said pulse responsive member, and means for determining the said longer interval of time automatically in dependency on the number of pulses received by the said pulse responsive member.

ERNEST UNGAR.

REFERENCES CITED

The following references are of record in the file of this patent:

UNITED STATES PATENTS

| Number | Name | Date |
|---|---|---|
| 1,726,983 | Friendly | Sept. 3, 1929 |
| 1,853,077 | Peterson | Apr. 12, 1932 |
| 2,094,060 | Busch | Sept. 28, 1937 |